United States Patent [19]

Hayakawa

[11] Patent Number: 5,027,244
[45] Date of Patent: Jun. 25, 1991

[54] READ/WRITE HEAD ASSEMBLY WITH ERASE GAPS OF MEANDERING SHAPE

[75] Inventor: Yuichi Hayakawa, Tokyo, Japan

[73] Assignee: NEC Corporation, Tokyo, Japan

[21] Appl. No.: 378,932

[22] Filed: Jul. 12, 1989

[30] Foreign Application Priority Data

Jul. 12, 1988 [JP] Japan ............... 63-174720

[51] Int. Cl.$^5$ ............... G11B 5/23
[52] U.S. Cl. ............... 360/119; 360/121
[58] Field of Search ............... 360/119–122

[56] References Cited

U.S. PATENT DOCUMENTS 4,849,841  7/1989  Sokolik ............... 360/119

Primary Examiner—A. J. Heinz
Attorney, Agent, or Firm—Sughrue, Mion, Zinn, Macpeak & Seas

[57] ABSTRACT

A magnetic transducer head assembly comprises a pair of magnetic core halves of generally C-shaped configuration and a coil wound on one of the core halves. The limbs of the C of each core half is in abutment relationship with those of the other core half to define a medium-contacting face and a magnetic gap on the medium-contacting face. The magnetic gap includes an inner gap section and outer gap sections respectively disposed on opposite ends of the inner gap section. Each of the outer gap sections has a gap length much greater than the gap length of the inner gap section and is in the shape of a meandering configuration which is formed by a series of crests on one of the core halves and a series of troughs on the other core half. The tips of the crests of each core half lie on an imaginary plane which is aligned or retracted from a plane defined by the inner gap section.

2 Claims, 1 Drawing Sheet

READ/WRITE HEAD ASSEMBLY WITH ERASE GAPS OF MEANDERING SHAPE

BACKGROUND OF THE INVENTION

The present invention relates generally to magnetic transducer head assemblies, and more specifically to a read/write transducer head assembly for recording signals along parallel tracks on a medium such as floppy disk.

U.S. Pat. No. 3,769,469 discloses a transducer head assembly comprising a pair of C-shaped magnetic core halves with the limbs of the core halves being opposed to form a closed-loop magnetic circuit and a medium-contacting face. A read/write gap and a pair of erase gaps are formed on the medium-contacting face. A coil is wound on one of the core halves for read/write operation. To generate erase flux across the erase gaps, a second coil is wound on the other core half.

To simplify the head assembly, Japanese Laid-Open Patent Publication Sho No. 59-139123 discloses a transducer head assembly which eliminates the second coil by forming a pair of rectilinear erase gaps each extending from each end of the read/write gap at an angle of 45 degrees to it. The azimuth angle of each erase gap makes 90 degrees relative to the fields recorded along opposite edges of a track, making the head insensitive to such fields. With this gap configuration, one of the core halves is trapezoidally shaped and the other is complementarily shaped to form a recess to accept the trapezoid. Since the recess of the other core half has a pair of side protrusions that extend from opposite ends of a center, rectilinear portion which defines the read/write gap with a corresponding portion of the trapezoid, and since the dimensions of the gaps are very small, it is impossible to precisely lap the rectilinear portion of the recess. This is detrimental to the fabrication of a precision magnetic head assembly.

SUMMARY OF THE INVENTION

It is therefore an object of the present invention to provide a precision magnetic head assembly having a single coil for read/write operations.

According to the present invention, the magnetic transducer head assembly comprises a pair of magnetic core halves of generally C-shaped configuration and a coil wound on one of the core halves, the limbs of the C of each core half being in abutment relationship with those of the other core half to define a medium-contacting face and a magnetic gap on the medium-contacting face. The magnetic gap includes an inner gap section and a pair of outer gap sections respectively disposed on opposite ends of the inner gap section, each of the outer gap sections having a gap length much greater than the gap length of the inner gap section and being in the shape of a zigzag pattern which is formed by crests on one of the core halves and troughs on the other core half, the tips of the crests of each core half being on an imaginary plane which is aligned or retracted from a plane defined by the inner gap section.

Since the tips of the crests of the outer gap sections are substantially on the same plane as the inner gap section, lapping can be easily and precisely performed on each core half to define the inner gap section.

BRIEF DESCRIPTION OF THE DRAWINGS

The present invention will be described in further detail with reference to the accompanying drawings, in which.

DETAILED DESCRIPTION

Figure 1:
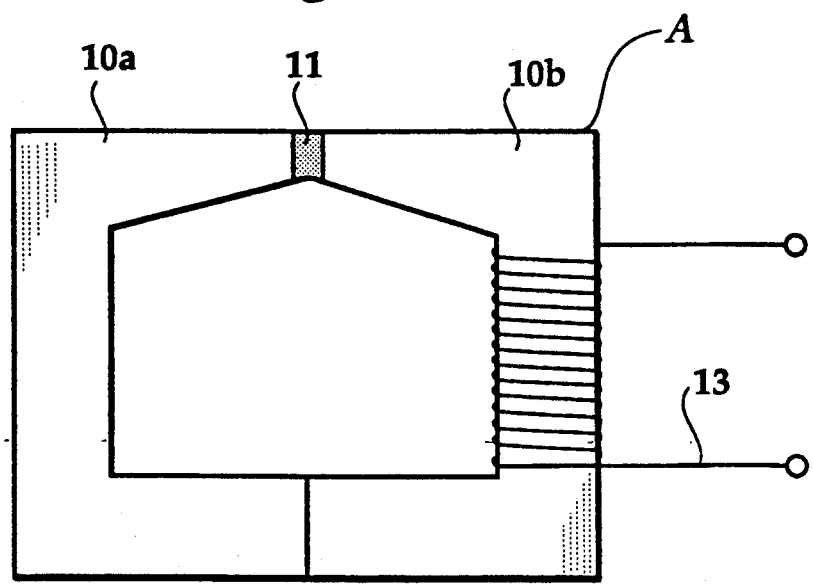
FIG. 1 is a side view in elevation of a read/write transducer head of the present invention.

As illustrated in FIG. 1, a read/write transducer head assembly of the present invention comprises a pair of generally C-shaped core halves of ferrite 10a and 10b with their upper and lower limbs being secured in an abutment relationship to form a closed loop magnetic circuit. A non-magnetic shim 11 is disposed between the upper limbs of the core halves 10a and 10b to form a magnetic gap 12 on a medium-contacting face "A" with which the head assembly is in contact with the surface of a floppy disk. A coil 13 is wound on the core halve 10b to conduct current for read/write operations.

Figure 2:
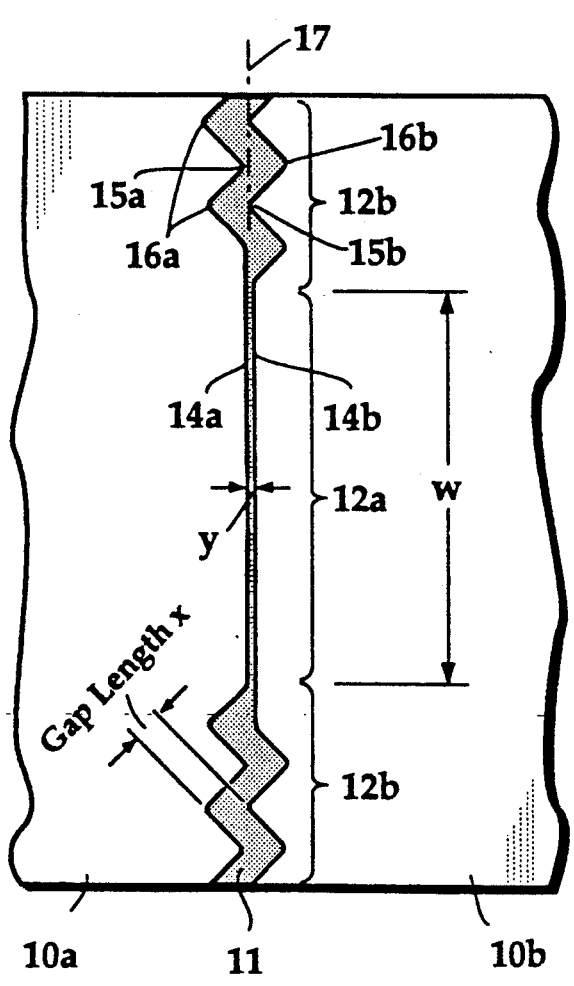
FIG. 2 is an enlarged front view of the read/write transducer head of FIG. 1 illustrating details of the magnetic gap.

As shown in detail in FIG. 2, the magnetic gap 12 comprises a inner gap section 12a and a pair of outer gap sections 12b which respectively extend outward from the opposite ends of the inner gap section 12a. The inner gap section 12a has a gap width w which extends across a center portion of a track of recording medium and is formed by a straight edge 14a on the core half 10a and a straight edge 14b on the core half 10b. Each of the outer gap sections 12b is formed by a series of crests 15a and troughs 16a on the core half 10a and a series of crests 15b and troughs 16b on the core half 10b, with crests 15a and troughs 16a being substantially aligned with troughs 16b and crests 15b, respectively, in a direction parallel to the directions of magnetic flux generated in the inner gap section 12a to thereby form a zigzag pattern. The gap length x defined between the parallel edges of the zigzag pattern is much greater than the gap length y.

When a signal current is caused to flow through the coil 13, a magnetic flux is generated across the gap 12. The center component of the flux generated in the inner gap section 12a is recorded in a magnetic medium, while the side component of flux generated in each of the outer gap sections 12b has different azimuth angles from that of the center flux component. When the read/write transducer head assembly is operating in a read mode, signals detected by the outer gap sections 12b differ in phase from those detected by the inner gap section 12a. Because of the phase differences and the greater gap length x than gap length y, none of the side components contribute to the generation of signals. Due to the different field orientations, no signals are reproduced from the side edge portions of a track when the head is deviated from its center. Therefore, the outer gap sections 12b have the same effect as if they erased the previously recorded signal.

The crests and troughs of each core half are formed by a known etching process on a flat surface of the upper limb. The crests so created by the etching process define an imaginary plane 17 which may be aligned with or somewhat retracted from the plane of a non-etched surface which serves as the straight edge 14. In this way, edges 14a and 14b can be lapped precisely to a mirror-finished surface using a suitable flat lapping tool.

Figure 3:
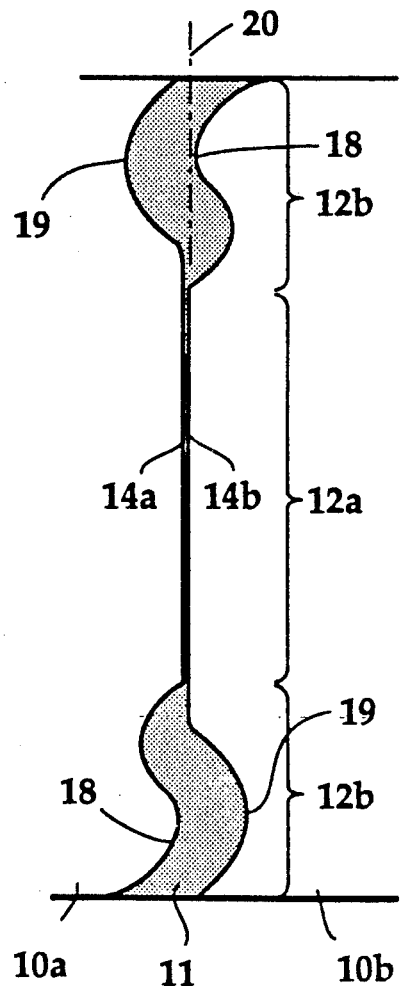
FIG. 3 is a view illustrating a modified magnetic gap.

As shown in FIG. 3, instead of a series of crests and troughs, each of the outer gap sections 12b can be formed by a single crest 18 of curved configuration on one half core and a single trough 19 of complementarily curved configuration on the other half core so that they jointly take the shape of a smoothly curved meandering path having a gap length much greater than the gap length of the inner gap section 12a. In this modification, the tip of the crest 18 on each half core is on an imaginary plane 20 which may be aligned with or somewhat retracted from the plane of the straight edge 14.

The foregoing description shows preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A magnetic transducer head assembly comprising a pair of magnetic core halves of generally C-shaped configuration and a coil wound on one of said core halves, the limbs of the C of each core half being in abutment relationship with those of the other core half to define a medium-contacting face and a magnetic gap on said medium-contacting face, said magnetic gap including an inner, read/write gap section and a pair of outer gap sections respectively disposed on opposite ends of said inner, read/write gap section, each of said outer gap sections having a gap length much greater than the gap length of said inner, read/write gap section and being in the shape of a zigzag configuration which is formed by crests on one of said core halves and troughs on the other core half, tips of said crests being on an imaginary plane which is aligned or retracted from a plane defined by said inner, read/write gap section.

2. A magnetic transducer head assembly as claimed in claim 1, wherein each of said crests and troughs lies on a curved path.

* * * * *